United States Patent [19]

Ito et al.

[11] Patent Number: 4,705,821

[45] Date of Patent: * Nov. 10, 1987

[54] ANTICORROSIVE METAL SURFACE TREATING COMPOSITION

[75] Inventors: Takeyasu Ito, Chiba; Teruaki Kuwajima, Higashiosaka, both of Japan

[73] Assignee: Nippon Paint Co., Ltd., Osaka, Japan

[*] Notice: The portion of the term of this patent subsequent to Sep. 10, 2002 has been disclaimed.

[21] Appl. No.: 731,951

[22] Filed: May 8, 1985

Related U.S. Application Data

[63] Continuation-in-part of Ser. No. 499,426, May 31, 1983.

[30] Foreign Application Priority Data

May 31, 1982 [JP] Japan .................................. 57-92663
Apr. 26, 1983 [JP] Japan .................................. 58-74247

[51] Int. Cl.$^4$ .............................................. C08J 3/24
[52] U.S. Cl. .................................. 524/407; 106/14.14; 148/6.20
[58] Field of Search ............................... 524/406, 407; 106/14.13, 14.14; 148/6.16, 6.20

[56] References Cited

U.S. PATENT DOCUMENTS 4,183,772 1/1980 Davis .................................. 524/407
4,540,733 9/1985 Ito et al. ............................. 524/407

OTHER PUBLICATIONS

Derwent Abstract, Accession No. 82-16310E/09, Japanese Pat. No. J56109260-A, Aug. 29, 1981.

*Primary Examiner*—Amelia Burgess Yarbrough
*Attorney, Agent, or Firm*—Wenderoth, Lind & Ponack

[57] ABSTRACT

An anticorrosive metal surface pretreating composition comprising an aqueous emulsion of hard polymer microparticles and a water soluble chromium compound, the polymer microparticles being prepared by emulsion polymerization of $\alpha,\beta$-unsaturated monomers including polyfunctional monomer(s) or monomer(s) capable of resulting polymer with a specific Tg value in the presence of a particular type of polymer as an emulsifier and a chromium compound, including specified amounts of trivalent chromium.

4 Claims, No Drawings

ANTICORROSIVE METAL SURFACE TREATING COMPOSITION

This is a Continuation-In-Part of Ser. No. 499,426 filed on May 31, 1983.

FIELD OF INVENTION

The present unvention relates to a metal surface pretreating composition for painting and more specifically, to a metal surface pretreating composition comprising an aqueous emulsion of hard polymer microparticles prepared by using a particular type of polymer as an emulsifier, and a water soluble chromium compound, capable of giving a pretreatment coating with improved anticorrosive, bending and scratch resistant properties.

BACKGROUND OF INVENTION

Various surface pretreatments have been practiced with metallic substrates as iron, zinc plated steel, aluminium and other plates, to improve corrosion resistance and coating adhesion thereof. Among the treatments proposed, particular attention is directed to, from the standpoint of easiness in operation and operational control, obviation of drain contamination, shortening of process steps and the like, a metal surface treatment with the so-called coating type, non-rinse chromate treating agent, wherein the treating liquid containing, as the main ingredients, a synthetic latex and a water soluble chromium compound is merely applied to the metal surface.

For this end, a number of proposals have been made as, for example, Japanese patent publication No. 31026/74; ibid 40865/74; ibid 1889/75 and the like. However, in the heretofore proposed treating compositions, troubles have always been encountered due to the presence of a surfactant or emulsifier used for the preparation of an emulsion. That is, for the purpose of maintaining an emulsion in its stabilized state the, employment of a surfactant or a emulsifier is essential but the presence of such material in the formed emulsion may inevitably cause adverse effects on the adhesion the, anticorrosion, and the water resistance of the coating prepared therefrom. Therefore, efforts have been made to solve the question of chemical stability of the emulsion without the help of conventional type surfactants or emulsifiers and obtain a stabilized composition comprising such emulsion and a water soluble chromium compound containing a trivalent and hexavalent Cr.

In the meantime, a technique has been proposed of using a water soluble type organic high molecular compound as an emulsifier in the preparation of a resinous emulsion. That is, in Japanese patent application Kokai No. 74934/76, there describes a composition comprising a polymeric emulsion and chromium compound, which is characterized by that the emulsion is prepared by using a defined amounts of particular polyacrylic acid or its ammonium salt and polymerizing $\alpha,\beta$-ethylenically unsaturated monomers, in the presence of water soluble persulfate, at a defined temperature. Also, in Japanese patent publication No. 39393/81, there is disclosed a metal surface treatment with the composition comprising as principal ingredients, a polymeric emulsion, a water soluble chromium compound and a water insoluble white carbon, the emulsion being prepared by emulsion polymerization of $\alpha,\beta$-monoethylenically unsaturated monomers using, as an emulsifier, specified amounts of polyacrylic acid and/or acrylic copolymer. The thus obtained emulsion per se, i.e. the emulsion obtained by using a water soluble organic high molecular compound as an emulsifier, is quite stable chemically and can give a stabilized composition when compounded with a chromium compound containing trivalent and hexavalent chromium and the resulting composition is very useful as a metal surface pretreating composition capable of forming a pretreatment film with excellent corrosion resistance and adhesion properties. However, in considering the surface pretreatment of the metallic substrate, it is of great importance to take into account, besides the stationary adhesion between the substrate and the composition, the coating adhesion under bending and processing conditions, as well as the scratch resistance of the coating. Generally speaking, the properties of film adhesion under bending conditions and of scratch resistance conflict with each other. In the aforesaid Japanese patent application Kokai No. 74934/76, attention is only directed to the adhesion under processing conditions and not to the scratch resistance at all. And, in Japanese patent publication No. 39393/81, the claimed effects are merely of the interaction of the disclosed three components, i.e. the emulsion, the water soluble chromium compound and the water insoluble white carbon, and no statements are given as to the scratch resistance and bending behavior in the two component system as in the present invention. Furthermore, even in the said three component system, the effects of scratch resistance and bending resistance fluctuate considerably and it was found that good results were not always obtained therewith. Especially, a low temperature bending will often cause troublesome adhesion failure and there is a trend that the more the trivalent chromium compound, the lesser the storage stability of the liquid concentrate.

Accordingly, an object of the present invention is to provide a metal surface pretreating composition comprising as principal ingredients, a polymeric emulsion and a chromium compound, the emulsion per se being stable without the help of conventional type surfactants or emulsifiers and capable of prducing a stabilized composition when compounded with a chromium compound, and the thus obtained composition having, especially prior to dilution with water, good storage stability and being capable of forming a coating with an excellent combination of properties of corrosion resistance, water resistance, scratch resistance and bending performance at normal and low temperature and the like. The invention is on the same line with those of the above said Japanese patent application Kokai No. 74934/76 and Japanese Patent Publication No. 39393/81 in that the emulsion stability and chemical stability can be maintained in the absence of conventional surfactants or emulsifiers and an excellent pretreatment coating in regard to corrosion resistance, water resistance and coating adhesion can be obtained therefrom. The invention has been made to achieve the above characteristics while paying attention to the stress relaxation in the metal surface treatment to obtain a good balance of each of the conflicting requirements of bending resistance and scratch resistance. Recently, a precoat metal plate, has been placed on the market, which is hardly ever or never cracked during the bending and processing thereof. In such a product, stress relaxation by cracking is primarily eliminated and therefore coating adhesion naturally become deteriorated with such a uniform coating. However, if something be devised to obtain an uneven coating wherein particle joining points are intentionally scattered throughout the coating, it would be quite effective for the aforesaid stress relaxation. Metal surfaces are, from the very nature of things, very irregular microscopically. Therefore, if the resinous particles are made in sufficiently smaller size so as to enter into the depressed portion and of hard nature, resistance to shearing stress would be naturally increased, thereby promoting stress relaxation in the proximity of the particles. With the abovesaid in minds, the inventors have devoted themselves to series of works and found that a coating type, non-rinse chromate pretreating composition capable or forming an excellent pretreatment in regard to corrosion resistance, bending and processing resistance, scratch resistance and the like can be obtained with the emulsion whose constituting polymer microparticles are of defined mean diameter and of hard material with the defined range of glass transition point or with the internally gelated structure, and on the basis of this finding, have completed the invention.

SUMMARY OF THE INVENTION

This invention provides an anticorrosive, metal surface pretreating composition comprising, as main components, (A) an aqueous emulsion of hard polymer microparticles obtained by emulsion polymerization of α, β-ethylenically unsaturated monomers, using, as an emulsifier, a polyacrylic acid and/or a copolymer of acrylic acid with at least one member selected from methacrylic acid, acrylamides, methacrylamides and hydrophilic monomers of the formula:

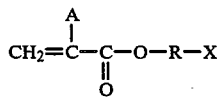

in which A stands for hydrogen atom or methyl group, R represents a substituted or unsubstituted alkylene having 2 to 4 carbon atoms, and X is a functional group containing at least one of oxygen, phosphorous and sulfur atoms, in an amount, on a solid basis, of 5 to 100 parts by weight per 100 parts by weight of said monomers, the polymer microparticles having a mean diameter of 0.1 to 3μ and being hardened by using as a part of said α, β-ethylenically unsaturaated monomers, either a monomer having in its molecule two or more ethylenical unsaturation bondings capable of entering into a radical polymerization, thereby causing inner gelation of the polymer, or appropriate monomers capable of bringing the glass transition temperature of the polymer to 15° to 110° C., and (B) a water soluble chromium compound, 25 to 50% by weight of whose chromium atoms are of trivalent, the weight ratio of emulsion solid to metal chromium being 1:10 to 5:1.

DESCRIPTION OF SPECIFIC EMBODIMENTS

The present emulsion may be prepared by emulsion polymerization means from common α, β-monoethylenically unsaturated monomers by using as an emulsifier a particular type water soluble polymer in a specified amounts, but selecting the monomers so as to produce a polymer having a particular range of glass transition temperatures or using as a part of said monomers at least one member having in its molecule two and more ethylenical unsaturations capable of entering in a radical polymerization (hereinafter called as poly-functional monomer).

As the abovesaid water soluble polymer, use is made of polyacrylic acid and/or a copolymer of acrylic acid with at least one member selected from the group consisting of methacrylic acid, acrylamides (e.g. acrylamide, N-methylol acrylamide), methacrylamides (e.g. methacrylamide, N-methylol methacrylamide) and hydrophilic monomers of the above said generic formula (e.g. monomers in which X represents oxygen atom bearing functional group like 2-hydroxyethyl acrylate, 3-hydroxybutyl acrylate, 2,2-bis(hydroxymethyl) ethyl acrylate, 2,3-dihydroxypropyl methacrylate, 3-hydroxybutyl methacrylate and the like; monomers in which X represents a phosphorous atom bearing functional groups like mono (2-hydroxyethylmethacrylate) acid phosphate and mono (3-chloro-2-hydroxypropyl methacrylate) acid phosphate and the like; and monomers in which X represents a sulfur atom bearing functional group like sulfonylethyl methacrylate and the like. They are used each singularly or in combination of more than two. In the abovesaid copolymer, the ratio of acrylic acid and the other hydrophilic monomer may be varied in a wider range and however, the acrylic acid content is generally determined in a range of more than 50% by weight, preferably more than 60% by weight, of the total monomers for reasons of stabilization of emulsion and adhesion to metallic substrate.

Examples of α, β-monoethylenically unsaturated monomers to be polymerized are acrylic esters (e.g. methyl acrylate, ethyl acrylate, isopropyl acrylate, n-butyl acrylate, 2-ethylhexyl acrylate, decyl acrylate, isooctyl acrylate, 2-ethylbutyl acrylate, octyl acrylate, methoxyethyl acrylate, ethoxyethyl acrylate, 3-ethoxypropyl acrylate and the like), methacrylic esters (e.g. methyl methacrylate, ethyl methacrylate, isopropyl methacrylate, n-butyl methacrylate, isobutyl methacrylate, n-hexyl methacrylate, lauryl methacrylate, decyloctyl methacrylate, stearyl methacrylate, 2-methylhexyl methacrylate, glycidyl methacrylate, 2-ethoxyethyl methacrylate, cetyl methacrylate, benzyl methacrylate, 3-methoxybutyl methacrylate and the like), acrylonitrile, methacrylonitrile, vinyl acetate, vinyl chloride, vinyl ketones, vinyl toluene and styrene. One or more than two of these members are used. It is also possible to add a small amount of the constituting monomers for the abovesaid water soluble copolymer, i.e. acrylamides, methacrylamides and hydrophilic monomers of the generic formula as mentioned before. Particularly useful members are OH bearing monomers as 2-hydroxyethyl methacrylate, since the latter may react with COOH group in the aforesaid emulsifier, thereby forming a bridged structure and resulting in a coating with markedly improved adhesion to the metal substrate. Though it is not essential in the present invention, it is preferred to present an amount of acrylonitrile, e.g. 5 to 10% by weight, in the polymerization monomers because of great improvement in the adhesion of emulsion particles towards the metal surface.

As explained hereinunder, the invention utilizes an emulsion of hard polymer microparticles. An advantageous approach for obtaining such microparticles is to use as a part of α, β-ethylenically unsaturated monomers a polyfunctional monomer having more than two polymerizable, ethylenical unsaturation bondings in its molecule, thereby forming internaly gelated polymer particles. As the polyfunctional monomers, mention is made of polymerizable, unsaturated monocarboxylic esters of polyhydric alcohols, polymerizable unsaturated alcohol esters of polycarboxylic acids and aromatic compounds substituted with more than 2 vinyl groups. Typical examples are ethyleneglycol diacrylate, ethyleneglycol dimethacrylate, triethyleneglycol dimethacrylate, tetraethyleneglycol dimethacrylate, 1,3-butyleneglycol dimethacrylate, trimethylol propane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate 1,1,1-trishydroxymethylpropane diacrylate, 1,1,1-trishydroxymethylpropane triacrylate, 1,1,1-trishydroxymethylpropane dimethacrylate, 1,1,1-trishydroxymethyl propane trimethacrylate, triallyl cyanurate, triallyl isocyanurate, triallyl trimellitate, diallylterephthalate, diallylphthalate and divinyl benzene.

The emulsion polymerization may be practiced under normal conditions in a conventional way, in the presence of water soluble free radical catalyst containing no alkali metal ions as ammonium persulfate and 2,2-azo-bis-(2-amidinopropane) hydrochloride, in an aqueous medium. For example, into a water (preferably deionized water) containing a part or whole of the abovesaid emulsifier and maintained at a polymerization temperature, are added dropwise and simultaneously a mixture of $\alpha,\beta$-monoethylenically unsaturated monomers and polyfunctional monomer if any, and an aqueous solution (preferably deionized water solution) of a water soluble catalyst having no alkali metal ions (e.g. ammonium persulfate) added with the remaining amounts of said emulsifier from each separate funnel, and the mixture is maintained at the same temperature for a while as desired. The polymerization is carried out under stirring and temperature is usually maintained at 50° to 90° C. The polymerization time (dropping plus curing) is usually 3 to 7 hours. The amount of said emulsifier should preferably be selected in a range, on solid basis, of 5 to 100 parts by weight per 100 parts by weight of the $\alpha,\beta$-monoethylenically unsaturated monomers to be polymerized. If the said quantity is less than 5 parts by weight, there is a trend for the storage stability of the emulsion per se to decrease, whereas even with an excess quantity over 100 parts by weight, there will be no particular effects on the storage stability of the emulsion per se and on the chemical stability of the composition compounded with water soluble chromium compound. Contrarily, too excess a quantity will cause an additional problem of foaming of the emulsion.

In the present invention the, thus obtained emulsion particles, however, should have a mean diameter of 0.1 to $3\mu$. As already stated, in the formation of uneven coatings, in order to obtain an improved adhesion to metal surface, it is essential that the emulsion particles be roughly distributed, get into the minute depressed portions of metal surface and be firmly adhered thereonto. The inventors have found that markedly improved adhesion can be obtained with an emulsion whose particle size is in a range of 0.1 to $3\mu$, and especially at around 0.3 to $2\mu$. It is generally well known that microparticle emulsion may be prepared by an emulsion polymerization technique using a high speed mixing and heating means, and that the emulsion particle size may be controlled at will by adjusting the operational conditions to be used. Therefore, any one skilled in the art may appropriately select optimum operational conditions in obtaining the abovesaid emulsion particle size.

As an aditional requirement, the present emulsion particles are composed of a hard polymer with a relatively higher resistance to shearing stress. To this end, a prescription is given on glass transition temperature (Tg) of said polymer or inner gelated structure thereof. Since the emulsion particles are of a defined mean diameter, they can easily get into minute depressed portions of the metal surface, and however, if they are, in addition, of comparatively hard material, it would be very effective for the stress relaxation in the vicinity of said particles.

In fact, the inventors have found that if the Tg value of said polymer is in a range of 15° to 110° C., preferably 40° to 110° C., there are marked improvements in the bending resistance and scratch resistance of thus formed coating. If the Tg is less than 15° C., the resulting coating is deficient in, among others, bending resistance and scratch resistance. On the other hand, it is generally impossible to obtain a polymer with Tg value of more than 110° C. from conventionally used $\alpha,\beta$-ethylenically unsaturated monomers. Since the Tg value of a polymer may be estimated and calculated from the kinds and amounts of the monomers to be polymerized, it would not be so difficult for a person skilled in the art to settle the glass transition point of the polymer in the abovesaid range.

Alternatively, the present emulsion microparticles may be composed of a hard polymer by using, as a part of the monomers, a polyfunctional unsaturated monomer, which causes an inner gelation in the respective molecule. As to the amount of said polyfunctional monomer, there is no particular limit on it, however, for the present purpose, it is generally sufficient enough to be in the range of 0.01 to 20% by weight, preferably 0.1 to 10% by weight, of the total monomers used.

The thus obtained emulsion is compounded with a specified amount of a water soluble chromium compound to produce the metal surface pretreating composition of this invention.

However, in this water soluble chromium compound, the trivalent chromium content should be 25 to 50% by weight, preferably 35 to 45% and most preferably 30 to 45% by weight, of the total chromium contained. Such chromium compound may be advantageously prepared by, for example, subjecting $CrO_3$ to a partial reduction with formaline, hydrogen peroxide or the like to the desired trivalent chromium level. If the trivalent chromium content is less than 25% by weight, there is a trend that bending resistance will become deteriorated and if it is more than 50% by weight, stability of liquid concentrated, when formulated, become delinquent.

The present metal surface pretreating composition can be prepared by mixing the abovesaid emulsion and water soluble chromium compound in water (preferably deionized water).

It is possible and most practicable to prepare the liquid concentrate with a comparatively smaller quantity of water for storage purpose and dilute it to an appropriate concentration with water just before the application thereof.

Of course, the treating composition of this invention may be directly formulated with a comparatively larger quantity of water from the first.

The compounding ratio of emulsion to water soluble chromium compound is another important factor of this invention. It is essential in the invention that the weight ratio of emulsion solid to metallic chromium be in a range of 1:10 to 5:1. In one embodiment of this invention, said ratio is determined in a range of 2:1 to 5:1, preferably 3:1. In this case, excellent storage stability of the liquid concentrate and excellent film performance in respect to the corrosion resistance, water resistance, scratch resistance, and bending resistance at normal and low temperatures may be obtained.

In another embodiment, said ratio is determined in a range of 1:10 to 2:1, preferably 1:2 to 2:1. This is especially useful for the surface treatment of steel and steel alloys in giving a far improved coating adhesion, besides the above. A lower limit of chromium content is essential because under the said range, there is a trend such that the corrosion resistance be ruined and effective adhesion between the under coat and metal surface be lost. Too large a quantity of metallic chromium over said range is not recomendable because of the poor adhesion of coating to the metal substrate.

The present metal surface treating composition may include, as desired, a quantity of silica microparticles up to the same level with that of chromium, to further improve the scratch resistance of the coating.

Examples of such silica or water insoluble white carbon materials are as follows:

(1) microparticles of silicic acid anhydride ($SiO_2 > 98$ wt %) having very little adhered or combined water, like fume silica (e.g. Aerosil, trade name of Degussa Co.; Cab-O-Sil, trade name of Cabot Co.) and silica produced by electric arc method (e.g. Arc-Silica, tradename of PPG Industries Inc.) and the like.

(2) microparticles of hydrated silicic acid ($80\% < SiO_2 < 98\%$) having comparatively larger quantity of water, like wet silica as Hi-Sil, trade name of PPG Industries Inc.; Ultrasil, trade name of Degussa Co.; Tokusil, trade name of Tokushima Soda Co. Ltd.; Carplex, trade name of Shionogi Pharmaceutical Co.; Cyloid, trade name of Fuji-Davison Ltd. and the like.

(3) microparticles of silicates, like calcium silicate and aluminium silicate, (4) Silica sol.

Certain silicates and wet silica products contain an amount of alkaline metal ions and when dispersed in water show an alkaline side pH. Such materials are to be omitted because the water resistance of the coating will be undesirably lowered by the presence of said alkali metal ions contained.

However, when making a 5% aqueous silica dispersion, if the pH is less than 7, such material may be successfully employed in the present invention.

The present composition may further include, as desired, various metallic-ions (except for alkaline metal ions) or inorganic-ion sources to the extent such as not to ruin the stabilized state of the composition. By the addition of such materials, it is possible to form on a metallic substrate a more uniform pretreatment coating with far improved adhesion. Examples of such ions are $Zn^{2+}$, $Co^{2+}$, $Fe^{2+}$, $PO_4^{3-}$, $F^-$, $BF_4^-$, $SiF_6^{2-}$ and the like.

The present metal surface pretreating composition may be applied by using any conventional means as for example roll coating, mist spraying and dipping, to various metal substrates (e.g. iron, zinc plated steel, aluminium and the like) and then dried to form the desired under coating thereupon.

Such coating is generally applied to in chromium coverage of 5 mg to 1 g/m$^2$, preferably 5 mg to 100 mg/m$^2$. If the metal content is outside the abovesaid range, there is a trend that the working performance will become deteriorated. In an actual coil coating line for zinc plated steel, steel or aluminium plates, preference is given to the so-called roll coating because a thin uniform pretreating coat can be obtained without the trouble of generation of color shading therewith.

As the drying condition, only evaporation of water in the under coating will do and in most cases, the maximum plate temperature is less than 120° C., preferably 80° to 110° C. and drying time is about 1 to 60 seconds. If it remotely departs from the above, there are instances where unfavorable results will come out in respect to the adhesion of the coating and especially the scratch resistance thereof. The present pretreatment is excellent in corrosion resistance and water resistance because of no surfactant is included in the emulsion of the pretreating composition, and furthermore, shows markedly improved adhesion properties particularly the bending resistance and scratch resistance.

In using the present pretreating composition, there is no need of the troublesome maintenance of the composition and for a consecutive mass production of the coated plates, the only requirement is the regular replenishment of the same composition. Thus, a uniform coating can be easily made and the desired pretreating coating can be obtained, after drying, consecutively. Since a rinsing and post-treatment are not required after said coating, processing steps are markedly shortened and no plants are necessitated for the treatment of contaminated waste water. The formed pretreating coat, as already stated, shows excellent film performance, especially in respect to the bending resistance and scratch resistance and therefore, the present composition is very useful for the pretreatment of various metal substrates for painting. The present surface pretreating composition surpasses others in, inter alia, storage stability of the liquid concentrate and low temperature workability, which are particular characteristics of the present composition.

The invention shall be now more fully explained in the following Examples. Unless otherwise being stated, all part and % are by weight.

Preparation of emulsion:

Reference Example 1 (High Tg Emulsion EM No. 1)

Into a flask fitted with stirrer, reflux condenser, thermometer and two dropping funnels, were placed 150 parts of deionized water and 120 parts of water soluble copolymer (25% aqueous solution, molecular weight MW 66000) obtained by copolymerizing acrylic acid and 2-hydroxyethyl methacrylate in weight ratio of 8:2, and the mixture was heated under stirring to 80° to 85° Then, a monomer mixture of 50 parts of methyl methacrylate, 30 parts of styrene, 10 parts of 2-hydroxyethyl methacrylate and 10 parts of n-butyl methacrylate from the first dropping funnel and a catalyst solution comprising 2 parts of ammonium persulfate and 50 parts of deionized water from the second dropping funnel were dropped in simultaneously over 3 hours. After completion of said addition, the mixture was further maintained and cured at 80° to 85° C. for about 2 hours to complete the polymerization. A uniform, stable emulsion was obtained (solid 30.1%, pH 1.6, grain diameter 0.2μ, Tg 89° C.).

Reference Example 2 (internally gelated Emulsion EM No. 2)

The same procedures as in Ref. Example 1 were repeated except for using a monomer mixture comprising 50 parts of methyl methacrylate, 27 parts of styrene, 10 parts of 2-hydroxyethyl methacrylate, 10 parts of n-butyl methacrylate and 3 parts of ethyleneglycol dimethacrylate. A uniform, stable emulsion was obtained (solid 30.0%, pH 1.6, grain diameter 0.55μ). It was confirmed that the emulsion particle was insoluble in xylene.

Reference Example 3 (High Tg, Acrylonitrile containing Emulsion EM No. 3)

The same procedures as in Reference Example 1 were repeated except for using a monomer mixture comprising 50 parts of methyl methacrylate, 25 parts of styrene, 10 parts of 2-hydroxyethyl methacrylate, 10 parts of n-butyl methacrylate, and 5 parts of acrylonitrile. A uniform, stable emulsion was obtained (solid 30.3%, pH 1.6, grain diameter 0.2μ, Tg 89° C.).

Reference Example 4 (Low Tg, Comparative Emulsion EM No. 4)

The same procedures as in Reference Example 1 were repeated except for using a monomer mixture comprising 75 parts of ethyl acrylate, 15 parts of styrene, and 10 parts of 2-hydroxyethyl methacrylate. A uniform, stable emulsion was obtained (solid 30.2%, pH 1.6, grain diameter 0.2μ, Tg -2° C.).

EXAMPLE 1

29.6 Parts of Emulsion EM No. 1 obtained in Reference Example 1 (solid 30.1%, grain diameter 0.2μ, Tg 89° C.) 33.6 parts of aqueous chromium solution obtained by adding 37% formaline to 17% aqueous chromic anyhydride solution and reducing 40% of hextaomic chromium to trivalent chromium (metallic chromium=33.6×0.17×0.52 (Cr/CrO$_3$)), and 36.8 parts of deionized water were combined and mixed well at a room temperature to obtain a liquid concentrate, which was then diluted with deionized water to 5 times weight to obtain a treating solution. The weight ratio of emulsion solid to metallic chromium was 3:1

Metal surface pretreatment and coating

A conventional zinc plated steel (Zerospangle plate, having skinpass) liable to be easily cracked when bended was first dewaxed with a commercialized alkaline dewaxing agent (Lidorin 155 manufactured by Nippon Paint Co., Ltd.) and rinsed well. After drying, thus treated plate was coated with the abovesaid treating solution by No. 3 bar so as to give the metal chromium coverage of 30 mg/m$^2$ and dried by hot air (70° C.). The plate was then applied with Superlack DIF P-75 primer (Nippon Paint Co., Ltd.) in dry film thickness of 3μ as under coating, baked at the maximum plate temperature for 50 seconds, applied with Superlac DIF F-50 Red Rust (Nippon Paint Co., Ltd.) in dry film thickness of 11μ as top coating and baked at the maximum plate temperature of 204° C. for 50 seconds. Stability of said liquid concentrate and performance test results with the abovesaid coated plate were shown in the following Table 1.

EXAMPLE 2

A liquid concentrate was prepared according to the procedure of Example 1 but using 29.7 parts of Emulsion EM No. 2 obtained in Reference Example 2, 33.6 parts of aqueous chromium solution stated in Example 1 and 36.7 parts of deionized water, which was then diluted with deionized water to 3.75 times weight to obtain a treating solution. The weight ratio of emulsion solid to metallic chromium was 3:1. This was then applied to Zerospangle plate as in Example 1 to a metallic chromium coverage of 40 mg/m$^2$, and thereafter under coating and top coating were applied thereto as in Example 1. Test results are shown in Table 1.

EXAMPLE 3

A liquid concentrated was prepared as in Example 1 using 29.4 parts of Emulsion EM no. 3 obtained in Ref. Example 3, parts of aqueous chromium solution stated in Example 1 and 37.0 parts of deionized water, which was then diluted with deionized water to 5 times weight. The thus obtained treating solution was applied to Zerospangle plate in a chromium coverage of 30 mg/m$^2$ and an under coating and top coating were then applied thereto as in Example 1. Test results are shown in Table 1.

COMPARATIVE EXAMPLE 1

The same procedures as stated in Example 1 were repeated except 29.5 parts of Emulsion EM No. 4 were substituted for 29.6 parts of Emulsion EM No. 1. The test results are shown in Table 1. In the following Table 1, stabilization of liquid concentrate were evaluated by visual observation of the state of said concentrate after being stored in a sealed polyethylene vessel at 20° C. for 1 month.

O no change
X gelation

As OT bending test, an adhesive tape was applied on a bended surface and then peeled off. 10 Points evaluation method was used as follows:

Point 10 ... no peeling
Point 1 ... thorough peeling

TABLE 1

|  | Ex. 1 | Ex. 2 | Ex. 3 | Comp. Ex. 1 |
|---|---|---|---|---|
| stability of liquid concentrate | O | O | O | X |
| −5° C. OT bending test | 10 | 10 | 10 | 8 |

EXAMPLES 4 TO 9 AND COMPARATIVE EXAMPLES 2 TO 6

Liquid concentrates were prepared according to the procedure of Example 1 with the prescriptions as given in Table 2. Emulsions stated in Reference Examples 1,2,3 and 4 were used in Examples 4,5,6 and Comparative Example 2, respectively and the Emulsion stated in Reference Example 1 was used in each Examples 7 to 9 and Comparative Examples 3 to 5. When referred to, 10% Aerosil 300 aqueous dispersion was used as silica. These liquid concentrates were diluted with deionized water to the prescribed dilution rate to obtain the treating solutions.

Molten zinc plated steel (Regular spangle with no skin pass) which was hardly liable to be cracked when bended, was used as metal substrate, to which was first applied the respective treating solution as in Example 1, then Superlac DIF P-75 Primer was applied as an under coating and Superlac DIF F-50 Red Rust applied as a top coating. The OT bending test (20° C.) was carried out with these test specimens.

Similar surface treated steel plates were prepared and then Superlac DIF F-15 Beige (Nippon Paint Co., Ltd) was applied to in dry thickness of 11μ and the coating was baked at the maximum plate temperature of 210° C. for 50 seconds. Using this one coat/one bake test specimen a, coin scratch test was carried out as follows:

The coating was scratched with an unnotched coin and the degree of injury to the surface were observed. The results was evaluated by a 5 points evaluation system from point 5 of excellent to point 1 of no good. The test results are shown in Table 2.

33.7 parts of deionized water, which was diluted with deionized water to 5 times weight.

The weight ratio of emulsion solid to the metal was 1.9:1 and the weight ratio of silica to metallic chromium was 1:2.

COMPARATIVE EXAMPLE 7

The procedures of Example 12 were repeated using 12.0 parts of Emulsion EM No. 4 of Reference Example 4, 40 parts of the same aqueous chromium solution as used in Example 12, 35.6 parts of 10% Aerosil 300 aqueous dispersion and 12.4 parts of deionized water. In this treating solution, the weight ratio of emulsion solid to

TABLE 2

|  | Ex. 4 | Ex. 5 | Ex. 6 | Comp. Ex. 2 | Ex. 7 | Ex. 8 | Ex. 9 | Comp. Ex. 3 | Comp. Ex. 4 | Comp. Ex. 5 |
|---|---|---|---|---|---|---|---|---|---|---|
| Liquid concentrate |  |  |  |  |  |  |  |  |  |  |
| Emulsion (parts) | 19.5 | 19.6 | 19.4 | 19.4 | 19.5 | 19.6 | 26.0 | 19.5 | 19.5 | 39.1 |
| Tg (°C.) | 89 | gelation | 89 | −2 | 89 | 89 | 89 | 89 | 89 | 89 |
| diameter (μ) | 0.2 | 0.55 | 0.2 | 0.2 | 0.2 | 0.2 | 0.2 | 0.2 | 0.2 | 0.2 |
| solid (%) | 30.1 | 30.0 | 30.3 | 30.2 | 30.1 | 30.1 | 30.1 | 30.1 | 30.1 | 30.1 |
| Chrom. comp. (parts) | 22.2 | 22.2 | 22.2 | 22.2 | 22.2 | 22.2 | 22.2 | 22.2 | 22.2 | 22.2 |
| $CrO_3$ (%) | 17 | 17 | 17 | 17 | 17 | 17 | 17 | 17 | 17 | 17 |
| reduc. (%) | 40 | 40 | 40 | 43 | 40 | 45 | 35 | 25 | 55 | 35 |
| Silica dis. (parts) | — | 10 | 10 | 10 | 10 | 20 | — | 10 | — | — |
| $SiO_2$ (%) | — | 10 | 10 | 10 | 10 | 10 | — | 10 | — | — |
| Deion. water (parts) | 58.3 | 48.2 | 48.4 | 48.4 | 48.3 | 38.3 | 51.8 | 48.3 | 58.3 | 38.7 |
| Em. solid/Cr | 3 | 3 | 3 | 3 | 3 | 3 | 4 | 3 | 3 | 6 |
| $SiO_2$/Cr | — | 0.5 | 0.5 | 0.5 | 0.5 | 1.0 | — | 0.5 | — | — |
| Treating solution |  |  |  |  |  |  |  |  |  |  |
| dilution times | 2.5 | 3.3 | 3.3 | 3.3 | 2.5 | 3.3 | 3.3 | 3.3 | 3.3 | 2.5 |
| Metallic Cr coverage (mg/m²) | 40 | 30 | 30 | 30 | 40 | 30 | 30 | 30 | 34 | 40 |
| Evaluation |  |  |  |  |  |  |  |  |  |  |
| stability of liquid concent. | O | O | O | Δ | O | O | O | O | X | O |
| 20° C. OT bending test | 7 | 8 | 8 | 6 | 7 | 7 | 7 | 5 | 6 | 5.5 |
| coin scratch test | 3.5 | 4 | 3.5 | 3 | 3.5 | 3.5 | 3.5 | 3 | 2.5 | 3 |

In the abovesaid liquid concentrate stabilization, the mark Δ stands for increased viscosity.

EXAMPLE 10

8.9 Parts of Emulsion EM No. 1 obtained in Ref. Example 1, 30 parts of aqueous chromium solution obtained by adding 37% formaline to 17.1% aqueous chromic anhydride solution and reducing 38% of hexatomic chromium to trivalent chromium, and 61.1 parts of deionized water were mixed together at a room temperature to obtain a liquid concentrate. Prior to application, this was diluted with deionized water to 5 times weight. The weight ratio of emulsion solid to metallic chromium was 1:1.

EXAMPLE 11

12.0 Parts of Emulsion EM No. 2, 40 parts of aqueous chromium solution obtained by adding 37% formaline to 17.1% aqueous chromic anhydride solution and reducing 35% of hexatomic chromium to trivalent chromium, 35.6 parts of 10% Aerosil 300 aqueous dispersion and 12.4 parts of deionized water were mixed together at a room temperature to obtain a liquid concentrate, which was then diluted with deionized water to 5 times weight. The weight ratio of emulsion solid to the metal was 1:1 and the ratio of silica to the metal was 1:1.

EXAMPLE 12

A liquid concentrate was prepared as in Example 11 using 23.0 parts of Emulsion EM No. 3 of Reference Example 3, 30 parts of aqueous chromium solution whose conversion rate to trivalent chromium was 40%, 13.3 parts of 10% Aerosil 300 aqueous dispersion and metallic chromium was 1:1 and the weight ratio of silica to metallic chromium was 1:1.

COMPARATIVE EXAMPLE 8

A liquid concentrate was prepared by using 0.6 parts of Emulsion EM No. 2 of Reference Example 2, 40 parts of aqueous chromium solution obtained by treating 17.1% aqueous chromic anhydride solution with formaline to 30% reduction, 45.6 parts of 10% Aerosil 300 aqueous dispersion and 13.8 parts of deionized solution, which was then diluted with deionized water to 5 times volume. The weight ratio of emulsion solid to metallic chromium was 1:20 and the weight ratio of silica to metallic chromium was 1.3:1.

To 0.6 mmt SPC steel plates previously dewaxed with Lidolin 53 (manufactured by Nippon Paint Co., Ltd.), was applied the respective treating solutions obtained in Examples 10 to 12 and Comparative Examples 7 to 8 in wet coating of 5 g/m² by No. 3 bar coater (chromium coverage 50 mg/m²) and dried in hot air drier (80° C. atmosphere temperature) for 1 minute.

Nippeprecoat 22 (manufactured by Nippon Paint Co., Ltd) was then applied to by curtain flow coater and after setting for 1 minute, baked at 220° C. for 3 minutes in hot air furnace to obtain 30μ coating. The bending and salt spraying tests were carried out and the following results were obtained.

TABLE 3

|  | Ex. 10 | Ex. 11 | Ex. 12 | Com. Ex. 7 | Com. Ex. 8 |
|---|---|---|---|---|---|
| Bending test |  |  |  |  |  |
| 1T | 4 | 4 | 4 | 3 | 2 |
| 3T | 5 | 5 | 5 | 5 | 5 |
| Salt spray test | O | O | O | O | O |

Shot blasted 10 mmt black steel plates were heated to 80° C. and dipped in surface treating solutions of Example 11 and Comparative Examples 7 and 8 previously raised to 50° C. and the plates were immediately taken up and dried in air.

In either case, chromium coverage was 400 mg/m². These plates were then heated to 200° C. and modified polyolefin (Adomer NEO50 manufactured by Mitsui Sekiyu Kagaku film (300μ) was bonded thereto under pressure, to which 3 mm polyethylene film previously heated was applied and bonded together under pressure (0.1 Kg/cm²). 180° peel strength of the respective laminates thus obtained was determined at 20° C. and under peeling speed of 50 mm/min. The results are shown in Table 4.

TABLE 4

|  | Ex. 11 | Com. Ex. 7 | Com. Ex. 8 |
|---|---|---|---|
| 180° peel strength (Kg/cm) | 8–10 | 6–8 | 6–8 |

Thus the coating adhesion of the present composition was excellent.

The following are comparative Examples to demonstrate the superiority of the present composition over those of the prior art, Davis U.S. Pat. No. 4,183,772 and Japanese patent unexamined publication No. 109260/81.

(A) Comparison with the invention of Davis, U.S. Pat. No. 4,183,772

(1) Preparation of internally gelated emulsion

Into a flask fitted with stirrer, reflux condenser, thermometer and two dropping funnels, were placed 150 parts of deionized water and 120 parts of polyacrylic acid ( 25% aq. solution, molecular weight 56000 ) and the mixture was heated under stirring to 80° to 85° C. Then, a monomer mixture of 50 parts of methyl methacrylate, 27 parts of styrene, 10 parts of 2-hydroxyethyl methacrylate, 10 parts of n-butyl methacrylate and 3 parts of ethylene glycol dimethacrylate, from the first dropping funnel and a catalyst solution comprising 2 parts of ammonium persulfate and 50 parts of deionized water from the second dropping funnel were dropped in simulataneously over 3 hours. After completion of said addition, the mixture was further maintained and cured at 80° to 85° C. for about 2 hours to complete the polymerization. Thereafter, agglomerate was removed off by using a 400 mesh stainless shieve. A uniform stable emulsion was obtained ( solid 29.0%, pH 1.6, grain diameter 0.4 ). This emulsion particles showed to be unable to be dissolved in xylene.

(2) Preparation of treating solution 20.3 parts of the abovesaid internally gelated emulsion ( solid 29%, grain diameter 0.4 micron ), 22.2 parts of aqueous chromium solution obtained by adding 37% formaline to 17% aqueous chromic anhydride solution and reducing 40% of hexa-valent chromium to trivalent chromium, 10 parts of 10% silica dispersion (Aerosil 300) and 48.2 parts of deionized water were mixed well at a room temperature to obtain a liquid concentrate, which was then added with deionized water to make a diluted (x 3.3) treating solution.

(3) The procedures of Example 1 of U.S. Pat. No. 4,183,772 were followed.

41.5 grams of chromium trioxide were dissolved in about 300 ml deionized water together with 14.5 grams phosphoric acid (100% $H_3PO_4$). The solution was agitated and heated to about 130° F. and 4.4 grams formaldehyde (100% HCHO) was slowly added. While stirring about one hour, the solution was maintained at a temperature of 190° F. Upon completion of the formaldehyde addition, heating was continued for 2 hours and the solution temperature maintained at or near boiling. About 300 ml. of deionized water was added to the solution and then 76 grams Acrysol A-1 ® on (25% solids polyacrylic acid, weight/volume) were introduced with stirring. The resulting solution was diluted with deionized water to a volume of about 800 ml., thoroughly mixed and allowed to set for 72 hours. In a separate container 160 grams Rhoplex AC-73 ® emulsion (46–47% solids weight/volume) was prepared as a 75% volume/volume "solution" in deionized water by adding sufficient water to make 200 ml. total. The diluted acrylic emulsion was slowly added to the aged reduced chrome-acrylic acid solution with stirring. Thus, a concentrated corrosion resistant coating composition was prepared. To 27 parts of this concentrated composition, were added 73 parts of deionized water to obtain a treating solution for the sake of comparison.

(4) Preparation of test panels

Gelvanized steel plate (Regular spangle with no skin pass) liable to be hardly cracked when bended, was first dewaxed with Ridorin 155 (alkaline dewaxing agent, manufactured by Nippon Paint Co., Ltd.) and rinsed well. After drying, thus treated plate was coated with the abovesaid treating solution by No. 3 bar coater so as to give the metal chromium coverage of 30 mg/m² and dried for 1 min. by not air (70° C.). The plate was then applied with Superlac DIF P-75 primer (Nippon Paint Co., Ltd.) in dry film thickness of 3 microns as under coat, baked at the maximum plate temperature of 204° C. for 50 seconds, applied with Superlac DIF F-50 Red Rust (Nippon Paint Co., Ltd.) in dry film thickness of 11 microns as top coat and baked at the maximum plate temperature of 204° C. for 50 seconds. The same procedures as stated hereinabove were repeated with the comparative treating solution to obtain a test panel. The coating amount was 200 mg/m² on the dried basis. With these coated plates, the following tests were carried out.

20° C. OT bending test

An adhesive tape was applied on bended surface and then peeled off at 20° C. The results were evaluated by 10 point system ranging from Point 10 showing no peeling to Point 1 showing thorough peeling.

Coin scratch test

The coating was scratched with unnotched coin and the degree of injure of the surface was observed. The results were evaluated by 5 point evaluation system ranging from point 5 of excellent to point 1 of no good. The test results were as follows:

|  | coated plate | comparative coated plate |
|---|---|---|
| 20° C. OT bend test | 8 | 7 |
| coin scratch test | 4 | 2 |

These datas clearly show that the present pretreatment composition can afford far superior results as compared with the Davis' composition.

(B) Comparison with the invention of Japanese patent application Kokai No. 109260/81

(1) Preparation of treating solution stated in Japanese patent application Kokai No. 109260/81

To 9.5 parts of $H_3PO_4$ containing 6.9 parts of $P_2O_5$, were added, under heating and stirring, 0.94 part of calcium hydroxide containing 0.49 part of calcium ion, to obtain a completely dissolved solution. To this, were added 0.5 part of aluminium hydroxide having 0.27 part of aluminium ion and dissolved therein. Thus obtained clear solution was allowed to cool to a room temperature, and then added with 2.3 parts of chromic anhydride containing 1.2 parts of $Cr^{6+}$ to obtain an orange clear solution. Next, 37% aqueous formalin solution was added to the abovesaid solution until the $Cr^{3+}$ ion content reached to 0.59 part, and the mixed solution was heated at 95° C. for 20 to 25 minutes and then allowed to cool. To this solution, 9 parts of Typake CR-50 (Al coated $TiO_2$, manufactured by Ishihara Sangyo K.K. were added and the mixture was subjected to a ultrasonic dispersion to obtain a uniformly dispersed liquid. To this, were added 0.21 part of sodium nitrate, 15 parts of Polysol (aqueous polyvinyl acetate solution, manufactured by Showa Kobunshi K.K.) and 35 parts of deionized water, and the mixture was uniformly mixed to obtain a viscous composition. To 11 parts of thus obtained composition, were added 89 parts of deionized water to obtain a comparative treating solution. Test panel was prepared according to the procedures stated in para. 4 of the preceeding paragraph A) but substituting the above for the disclosed treating solution, and the same was subjected to 20° C. OT bending test and coin scratch test. Test results are shown below.

| 20° C. OT bending test | 1 |
| --- | --- |
| coin scratch test | 2 |

The reason why the abovesaid composition become thicken, is believed to be explained as follows.

Since the chromium compound containing $Cr^{3+}$ ion is added to an emulsion without the present particular emulsifier, the said $Cr^{3+}$ ion must be brought to unstable condition thereof. This thickening may obstruct a uniform coating of the treating solution, which must be a cause of inferior results of the coated product.

What is claimed is:

1. A metal surface treating composition having improved anticorrosive, bending and scratch resistant properties consisting essentially of an aqueous emulsion of hard polymer microparticles obtained by emulsion polymerization of α, β-ethylenically unsaturated monomers in the presence of an emulsifier in an amount, on the solid basis, of 5 to 100 parts by weight per 100 parts by weight of said monomers, said emulsifier being selected from the group consisting of polyacrylic acid, a copolymer of acrylic acid with at least one member selected from the group consisting of methacrylic acid, an acrylamide, a methacrylamide or a hydrophilic monomer of the formula:

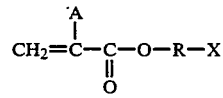

in which A stands for a hydrogen atom or a methyl group, R represents a substituted or unsubstituted alkene having 2 to 4 carbon atoms, and X is a functional group containing at least one of oxygen, phosphorous and sulfur atoms, and mixtures of said acrylic acid and copolymer, wherein said α, β-ethylenically unsaturated monomers to be polymerized are selected from the group consisting of acrylic esters, methacrylic esters, acrylonitrile, methacrylonitrile, vinyl acetate, vinyl chloride, vinyl ketones, vinyl toluene, styrene, acrylamides, methacrylamides and the hydrophilic monomers of the formula above; the polymer microparticles having a means diameter of 0.1 to 3μ and being hardened by using as a part of said α,β-ethylenically unsaturated monomers, either a monomer having in its molecule two and more ethylenical unssaturation bondings capable of entering into a radical polymerization, thereby causing inner gelation of the polymer, or by using appropriate monomers capable of bringing the glass transition tempertaure of the polymer from 15° to 110° C., and a water soluble chromium compound in which 25 to 50% by weight of the chromium atoms are trivalent, the weight ratio of emulsion solid to metal chromium being 1:10 to 5:1.

2. A composition according to claim 1 wherein the content of trivalent chromium in the water soluble chromium compound is 35 to 45% by weight of the total chromium contained.

3. A composition according to claim 1 wherein the glass transition temperature of the emulsion polymer is 40° to 110° C.

4. A composition according to any one of the preceding claims wherein the weight ratio of emulsion solid to metal chromium is 2:1 to 1:2.

* * * * *